United States Patent [19]

Dombro

[11] 4,279,780
[45] Jul. 21, 1981

[54] METHOD OF PREPARING CATALYST SUPPORTS

[75] Inventor: Robert A. Dombro, Clinton, Iowa

[73] Assignee: Chemplex Company, Rolling Meadows, Ill.

[21] Appl. No.: 141,570

[22] Filed: Apr. 18, 1980

[51] Int. Cl.$^3$ .................. B01J 29/00; B01J 37/02
[52] U.S. Cl. .................. 252/452; 252/454; 252/458; 526/96; 526/106
[58] Field of Search .......... 252/452, 454, 458; 526/96, 106

[56] References Cited

U.S. PATENT DOCUMENTS

| | | | |
|---|---|---|---|
| 3,193,492 | 7/1955 | Plank et al. | 252/452 |
| 3,862,104 | 1/1975 | Witt | 252/458 |
| 3,867,306 | 2/1975 | Witt et al. | 252/452 |
| 3,875,079 | 4/1975 | Witt | 252/458 |
| 3,878,130 | 4/1975 | Michel et al. | 252/458 |
| 3,887,494 | 6/1975 | Dietz | 252/454 |
| 3,950,316 | 4/1976 | Witt | 252/458 |
| 4,053,436 | 10/1977 | Hogan et al. | 252/458 |
| 4,119,569 | 10/1978 | Dietz | 252/452 |
| 4,128,500 | 12/1978 | Hwang et al. | 252/431 R |
| 4,152,503 | 5/1979 | Short et al. | 526/106 |

Primary Examiner—O. R. Vertiz
Assistant Examiner—Wayne A. Langel
Attorney, Agent, or Firm—Wegner, Stellman, McCord, Wood & Dalton

[57] ABSTRACT

A method of preparing large pore volume zirconia-silica catalyst supports, the resulting supports and a method of polymerizing olefins comprising contacting an olefin or mixture of olefins with a catalyst prepared with these supports. The supports are prepared by reacting a zirconium compound of the formula $M_4Zr(C_2O_4)_4 \cdot nH_2O$, where M is an alkali metal or ammonium ion and n equals 0 to 10, with a silicon compound of the type $A_2SiO_3$, where A is an alkali metal, in an aqueous solution at a pH equal to at least 11, then adding an acidic solution to a pH of about 5-9 to produce a hydrocogel. The hydrocogel is then aged and washed free of soluble by-products first with water, then with aqueous ammonium nitrate and again with water. The water is removed from the washed hydrocogel by azeotropic distillation or by washing with a water miscible solvent, then residual water is removed by chemically reacting this water with a ketal of the formula $RC(OR)_2R$ where R is the same or different and is an alkyl group of 1-5 carbon atoms, and then calcining the resulting xerocogel.

10 Claims, No Drawings

METHOD OF PREPARING CATALYST SUPPORTS

BACKGROUND OF THE INVENTION

One of the features of this invention is to provide an improvement in the preparation of large pore volume xerogels or xerocogels which are useful as polyolefin catalyst supports, some of which possess improved thermal stability. Chromium(II), chromium(III) or chromium(VI) compounds based on these supports are catalysts that are capable of producing polyethylene resins of melt index greater than about eight.

Another feature of this invention is to prepare an improved large pore volume zirconia-silica catalyst support by reacting a particular zirconium compound with a particular silicate to produce a hydrocogel, aging the hydrocogel, washing with water and then aqueous ammonium nitrate and again with water, removing water from the resulting washed hydrocogel to produce a xerocogel either by azeotropic distillation or by leaching with a water miscible solvent, after which residual water is removed by chemically reacting this water with a ketal of the above formula $RC(OR)_2R$, and then calcining the resulting xerocogel.

Another feature of the invention is to provide a catalyst support prepared by the above method.

A further feature of the invention is a method of polymerizing olefins comprising contacting the olefins with a catalyst comprising the above support and a chromium compound associated with it under polymerizing conditions.

The following prior art is believed to be the most pertinent:

Aboutboul et al U.S. Pat. No. 3,978,002 discloses a chromium(VI)oxide olefin polymerization catalyst comprising a silica xerogel support obtained by dehydrating the corresponding hydrogel by extraction with acetone. A polymerization process using such a catalyst support for the production of ethylene polymers produces polyethylene resins having relatively low molecular weights and, therefore, high melt index in the range 3.2-4.2 (obtained without hydrogen modification).

Bachl et al U.S. Pat. No. 4,042,770 relates to a process for the manufacture of olefin polymers with the aid of a specially prepared silica-chromium(VI)oxide catalyst. The specially prepared silica hydrogel is dehydrated by extraction with an organic liquid selected from $C_1$–$C_4$ alkanols and/or $C_3$–$C_5$ alkanones (ketones) until the organic liquid absorbed no more water. The dehydrated gel is then freed of organic liquid by drying at 120° C. to give the final xerogel. Doping with chromium(VI)oxide and air activation resulted in catalysts which produced ethylene polymers with very low melt index.

Short et al U.S. Pat. No. 4,081,407 describes a method for treating a hydrocogel consisting of coprecipitated silica-titania, 2.5 wt.% titanium (U.S. Pat. Nos. 3,950,316 and 3,862,104), with a saturated aliphatic alcohol selected from the group consisting of 1-pentanol, 3-methyl-1-butanol, 4-methyl-2-pentanol, 2,2-dimethyl-1-propanol, and 1-hexanol to remove water azeotropically or by extraction. The dried product retains a porous structure and is particularly suitable upon impregnation with a polymerization catalyst component, such as chromium(VI)oxide, for use in promoting the production of ethylene polymers of melt index in excess of about 6.6 (highest value disclosed is 7.5). These inventors discovered that the specific solvents disclosed removes water from the hydrocogels and affects the melt index of the polymer produced in polymerization reaction using catalysts supported on these strata.

Hwang et al U.S. Pat. No. 4,128,500 discloses chromium(III)acetylacetonate type catalysts. Dombro et al patent application Ser. No. 44,004, filed May 31, 1979, describes novel methods of preparing zirconia-silica xerocogels. Both are assigned to the assignee hereof.

SUMMARY OF THE INVENTION

With this invention polyethylene resins of melt index in excess of about eight are easily produced without the use of hydrogen during the synthesis. This improvement is attributed to the ability of a ketal to scavenge, and irreversibly chemically react, with water within the pores of the hydrogel or hydrocogel, thereby leaving behind a stable highly porous structure. In other words, the invention process to remove water can clearly affect the melt index of the resulting polymer produced in polymerization reactions using catalysts, especially chromium(II), chromium(III) or chromium(VI) compound types, supported on strata produced from a hydrogel or hydrocogel, especially a zirconia-silica hydrocogel. Melt indices greater than about eight are not easily achieved by conventional particle form ethylene polymerization processes employing a chromium-containing catalyst system in the absence of hydrogen during resin synthesis.

A further advantage of this invention resides in the fact that the by-products from the chemical reaction of a ketal with water may be used to remove bulk water (up to about 90%), after which the leached product is contacted in a separate compartment with pure ketal in order to chemically remove the residual water.

The ketal may also be easily applied, via vaporization through a fluid bed, to remove physisorbed water from conventional commercial porous supports.

DESCRIPTION OF THE PREFERRED EMBODIMENTS

This invention provides a method for treating a hydrogel or hydrocogel with a water-miscible ketone, alcohol, or mixtures thereof to facilitate removal of bulk water followed by treating the resulting partially dehydrated hydrogel or hydrocogel with a ketal of the formula $RC(OR)_2R$ in which each R is an alkyl group of 1-5 carbon atoms and the R groups are the same or different. This completely removes residual water irreversibly by a chemical reaction. Of course, bulk and residual water can, if desired, be removed exclusively and irreversibly through chemical reaction with the ketal alone. A xerogel or xerocogel with a porous structure is obtained. These find utility as polyolefin catalyst supports, promoting the production, for example, of ethylene polymers with high melt index.

The resulting supports are, in general, suited for chromium-containing polymerization catalysts and are especially suited for chromium(III)acetylacetonate catalysts since water is not reintroduced by the use of this chromium source when it is dry blended with the porous support prior to thermal activation to produce the catalyst. Ethylene polymers of melt index in excess of about eight without hydrogen modification may be produced.

Examples of ketals of the formula $RC(OR)_2R$ are: 2,2-dimethoxypropane, 2,2-dimethoxybutane, 2,2-diethoxypropane, 2-methoxy-2-ethoxypropane, and the like.

Resins of melt index greater than about eight are obtained when a ketal is used to remove water according to the following process:

(1) Water removal from a washed hydrogel or hydrocogel by either of two ways: (a) by leaching with water miscible ketone, alcohol or mixtures thereof to remove bulk water and then treating the partially dehydrated product with a ketal whereby residual water is completely and irreversibly removed by a chemical reaction, or (b) by contacting the hydrogel or hydrocogel directly with a ketal. In general, heat and a catalytic amount of acid, if necessary, may be applied to facilitate the reaction of the ketal with water.

The resulting xerogel or xerocogel is then freed of absorbed ketone, alcohol, and ketal, and is then calcined at about 1000°–1850° F. prior to use as an olefin polymerization catalyst support. The concentration of zirconia ($ZrO_2$) in a xerocogel is in the range 0.1–67.5 wt.%, but preferably is between 2–3 wt.%.

(2) The preferred use of a zirconia-silica xerocogel is as a catalyst support prepared by coprecipitating hydrous zirconia and hydrous silica. This is accomplished by reacting a zirconium compound of the type $M_4Zr(C_2O_4)_4 \cdot nH_2O$ where M is an alkali metal but preferably ammonium ion, n equals 0 to about 10, with a silicon compound of the type $A_2SiO_3$, where A is an alkali metal, in aqueous solution to a pH of between 5 and 9 by the addition of an acidic compound such as sulfuric acid. The resulting hydrocogel is then aged at ambient to 90° C. for at least one hour followed by washing with water, aqueous ammonium nitrate, and again water. Water is removed as described in 1, above.

(3) A chromium(II), chromium(III) or chromium(VI) compound as the active polymerization ingredient is dry blended with the xerogel or xerocogel and if necessary the composite may be activated by heat in nitrogen, followed by a dry air treatment in a fluid bed or activated by heat in dry air. Activation temperatures above ambient up to 1750° F. are preferred. Examples of chromium(II) compounds are chromocene or cyclopentadienyl chromium ethoxide; examples of chromium(III) compounds are chromium(III)acetate, chromium(III)propionate and preferably chromium(III)acetylacetonate; examples of chromium(VI) compounds are chromium(VI)trioxide, ammonium dichromate, and bis-triphenylsilyl chromate.

EXAMPLE 1 (Invention)

This example illustrates the invention of preparing novel highly porous supports. In this invention a hydrocogel, containing zirconia from ammonium tetraoxalatozirconate, is dehydrated chemically and irreversibly with a ketal. The end result is the production of polyethylene resins of melt index greater than about eight with chromium type catalysts based on these novel highly porous supports.

A solution of 13 grams of ammonium tetraoxalatozirconate (IV)pentahydrate in 400 cc. deionized water (pH=4.5) was added at about 20° C. to a stirred solution of 400 grams of sodium silicate in 800 cc. of deionized water. Ammonia was liberated and a clear solution with a pH of 11.3 was obtained. Dilute sulfuric acid (12.75%) was then added until a pH of about 6.2 was reached. The resulting coprecipitate or hydrocogel was then aged for at least one hour, for example seven hours, at about 90° C. while maintaining the pH at 6.3 with additional dilute sulfuric acid. Following aging, the hydrocogel was collected by filtration and washed first with deionized water, a solution of 1% ammonium nitrate, and finally with deionized water.

The washed hydrocogel was partially dehydrated by extraction with acetone according to the invention. Residual water was then chemically reacted away by heating with 2,2-dimethoxypropane. By-product acetone and methyl alcohol were distilled until essentially pure ketal began to distill. The recovered xerocogel containing 2.7 wt.% zirconia was dry blended with chromium(III)acetylacetonate and activated by nitrogen fluidization at 1700° F. followed by dry air treatment at 1300° F. The polyethylene resin produced by this catalyst had a surprisingly high MI of 10.6 without the use of hydrogen during synthesis. A second resin batch had an MI of 12.4 These MI values exceed all published values in the prior art discussed above.

EXAMPLE 2 (INVENTION)

This example is similar to Example 1 except that the chromium source is chromium(VI)oxide and the xerocogel is completely dehydrated with 2,2-diethoxypropane.

The washed hydrocogel, prepared as described in Example 1, is partially dehydrated by extraction with acetone followed by complete dehydration with 2,2-diethyoxyethane. The dry xerocogel containing 2.7 wt.% zirconia is dry blended with anhydrous chromium(VI)oxide and made active in air at 1700° F. The polyethylene resin produced by this catalyst had a melt index greater than about 8.

EXAMPLE 3 (COMPARATIVE)

This example shows the negative effect on resin melt index when water is removed from the hydrocogel of Example 1 azeotropically with ethyl acetate.

The washed hydrocogel prepared as described in Example 1 was dehydrated azeotropically with ethyl acetate to yield a xerocogel containing 2.7 wt.% zirconia. A catalyst was prepared by dry blending the xerocogel with chromium(III)acetylacetonate and nitrogen fluidizing at 1700° F. followed by a dry air treatment at 1300° F. Ethylene polymerization gave a resin with an MI of 2.7, a value much lower than that presented in Example 1.

EXAMPLE 4 (COMPARATIVE)

This example shows the negative effect on resin melt index when zirconia is not coprecipitated with silica.

Dilute aqueous sulfuric acid (12.75%) was added to a stirred solution of 403 grams of sodium silicate in 509 cc deionized water (pH=11.7). When a pH of about 6.2 was reached, the slurry was aged by heating at least one hour with stirring at 80°–88° C. while maintaining the pH at 6.2 by additional dilute sulfuric acid. After aging, the hydrogel was recovered by filtration and was washed first with deionized water, a solution of 1% ammonium nitrate, and finally with deionized water in order to remove all soluble by-products.

The washed hydrogel was dehydrated according to the present invention, that is, by extracting or leaching bulk water with acetone followed by removal of residual water chemically by reaction with a ketal, 2,2-dimethoxypropane. This is accomplished by distilling a mixture of 2,2-dimethoxypropane and the partially dehydrated hydrogel until the pure ketal begins to distill. This occurs after the by-products of acetone and methyl alcohol have been removed by distillation. The silica xerogel was dry blended with chromium(III)acetylacetonate and activated at 1700° F. in nitrogen followed by dry air treatment at 1300° F. The polyethylene resin produced by this catalyst showed a low MI of 1.1.

EXAMPLE 5 (COMPARATIVE)

This example illustrates the adverse effect on resin melt index when the zirconia source is zirconium sulfate which is coprecipitated with silica followed by dehydration of the hydrocogel with a ketal.

A solution of 8 grams zirconium sulfate $H_2ZrO(SO_4)_2.3H_2O$ in 400 cc water (pH=2.0) was added to a solution of 400 grams sodium silicate in 800 cc water with stirring. A solution with a pH of 11.4 containing a small amount of precipitate was obtained. Filtration of this solution yielded a clear solution to which dilute sulfuric acid (12.75%) was added until a pH of 6.2 was reached. This pH was maintained while the coprecipitate was aged three hours at 80° C. After aging, the hydrocogel was recovered by filtration and washed as described. The washed hydrocogel was dehydrated with a ketal, 2,2-dimethoxypropane, as described in Example 1. The recovered xerocogel containing 2.2 wt.% zirconia was dry blended with chromium(III)acetylacetonate activated at 1700° F. in nitrogen and air treated at 1300° F. The polyethylene resin produced by this catalyst had a very low melt index of 0.2.

Examples 1 and 2 point to a unique combination. That is a catalyst obtained by combining a chromium compound with a hydrocogel dehydrated chemically and irreversibly with a ketal, and containing zirconia from ammonium zirconium oxalate. Polyethylene resins are produced with melt indices that are greater than about eight.

The catalysts disclosed herein are useful for polymerizing 1-olefins of 2–8 carbon atoms and copolymerizing mixtures of these with 1-olefins of 2–20 carbon atoms.

and then adding an acidic material to a pH of about 5–9, to produce a hydrocogel;

b. aging said hydrocogel at a temperature between about ambient to 90° C. for at least one hour;
c. washing said hydrocogel of b first with water, then with aqueous ammonium nitrate and again with water;
d. partially dehydrating the resulting washed hydrocogel of c by azeotropic distillation by mixing with a compound capable of forming an azeotrope with water or by washing the hydrocogel with a water miscible solvent to produce a substantially water-free, large pore volume zirconia-silica catalyst support;
e. removing residual water from the product of d by chemically reacting this water with a ketal of the formula $RC(OR)_2R$ in which R is the same or different and is an alkyl group of 1–5 carbon atoms; and
f. calcining the resulting xerocogel at a temperature of about 1000°–1850° F. preparatory to its use as an olefin polymerization catalyst support.

2. The method of claim 1 wherein M is an alkali metal ion.

3. The method of claim 1 wherein M is an ammonium ion.

4. The method of claim 1 wherein said acidic compound in said aqueous solution is sulfuric acid, hydrochloric acid or ammonium sulfate.

5. The method of claim 1 wherein water is partially removed from the washed hydrocogel by azeotropic distillation with a compound capable of forming an azeotrope with water.

6. The method of claim 1 wherein water is partially removed by washing the hydrocogel with a water miscible solvent.

TABLE

| Example No. | Wt. % $ZrO_2$ | $ZrO_2$ Source[a] | Method of Water Removal[b] | Chromium[e] Source | Resin Milled[f] Melt Index |
|---|---|---|---|---|---|
| 1 | 2.7 | $NH_4ZrOx$ | acetone/2,2-DMP[c] | $Cr(AcAc)_3$ | 10.6 (12.4) |
| 2 | 2.7 | $NH_4ZrOx$ | acetone/2,2-DEP[d] | $CrO_3$ | >10 |
| 3 | 2.7 | $NH_4ZrOx$ | EtOAc azeotrope | $Cr(AcAc)_3$ | 2.7 |
| 4 | None | None | acetone/2,2-DMP | $Cr(AcAc)_3$ | 1.1 |
| 5 | 2.2 | $OZr(SO_4)$ | acetone/2,2-DMP | $Cr(AcAc)_3$ | 0.2 |

[a]$NH_4ZrOx$ is ammonium tetraoxalatozirconate (IV) hydrate; $OZr(SO_4)$ is zirconyl sulfate.
[b]From hydrogel or hydrocogel.
[c]Bulk water removed with acetone; residual water removed by an irreversible chemical reaction with 2,2-dimethoxypropane.
[d]2,2-DEP is 2,2-diethoxypropane.
[e]The active polymerization ingredient; $Cr(AcAc)_3$ is chromium (III) acetylacetonate.
[f]Polyethylene resin milled melt index determined according to ASTM D1238-62T Condition E. Polymerization conditions: 225° F., 550 psig, no hydrogen, and 2900 cc isobutane. The melt index of each recovered resin was compared at a productivity level of about 2000 g resin/g catalyst.

I claim:

1. The method of preparing large pore volume zirconia-silica useful as a catalyst support for a catalyst for polymerizing and copolymerizing olefins, comprising:
   a. reacting a zirconium compound of the formula $M_4Zr(C_2O_4)_4.nH_2O$, where M is an alkali metal or ammonium ion and n equals 0 to 10, with a silicon compound of the type $A_2SiO_3$, where A is an alkali metal, in an aqueous solution at a pH of at least 11

7. The method of claim 1 wherein said ketal comprises 2,2-dimethoxypropane.

8. The method of claim 1 wherein said ketal comprises 2,2-dimethoxybutane.

9. The method of claim 1 wherein said ketal comprises 2,2-diethoxypropane.

10. The method of claim 1 wherein said ketal comprises 2-methoxy-2-ethoxypropane.

* * * * *